UNITED STATES PATENT OFFICE.

RUSSELL THAYER, OF PHILADELPHIA, PENNSYLVANIA.

METHOD OF RECOVERING GOLD.

1,323,124.   Specification of Letters Patent.   Patented Nov. 25, 1919.

No Drawing.   Application filed July 9, 1918.   Serial No. 244,073.

*To all whom it may concern:*

Be it known that I, RUSSELL THAYER, a citizen of the United States of America, residing in the city and county of Philadelphia, in the State of Pennsylvania, have invented certain new and useful Improvements in Methods of Recovering Gold, of which the following is a true and exact description.

My invention relates to the extraction of gold from sands or ores in which the gold is found in the state of a "gel" in a collodial form, or condition extremely comminuted, which precludes its commercial extraction by known methods.

I have discovered that by mixing such sands, or ores reduced to a sand like fineness, with an alkali, preferably sodium hydroxid, sufficient water also being used to moisten the magma, and subjecting the mixture to a roasting heat driving off the mercury if used, the gold, previously in a colloidal, or extremely finely divided form or state, which prevented its commercial recovery by known treatments, is left in the sand in a new form or crystalline state as metallic gold which permits its ready recovery by amalgamation or any other familiar mode of treatment. In some cases I have found it advisable to use mercury with sodium hydroxid or a similar alkali, but with most of the sands with which I have worked I find it unnecessary to use mercury and make an economic recovery of gold with the sodium hydroxid.

My invention then consists primarily in the treatment of auriferous sand and ores containing gold in a colloidal, genetic, or extremely finely comminuted condition with an alkali and heat to bring the gold into a recoverable form, and as a complete process my invention consists in treating the ore or sand as above stated and recovering the gold from the treated ore or sand by amalgamation or other known methods of recovering gold.

The ores which I have successfully treated are mainly the great bodies of glacial moraine sands existing in New York State, notably in the counties of Hamilton, Fulton, Franklin, Saratoga, Lewis, Herkimer, and St. Lawrence. Similar sands from other deposits show similar results, and various rocks, containing gold in the colloidal condition, or in a form which precludes its commercial extraction, give similar results when treated by my method, the rock being first crushed and ground to a sand like fineness. I have discovered and proved that the gold in such sands or ores is found not in the grains of quartz, or other material making up the body of the sand or rock, but in the substance deposited on the grains of sand or cementing them together, the colloidal gold forming a part thereof.

In practising my process I dissolve about three pounds of sodium hydroxid in two hundred pounds of water, and use this solution to wet a ton of the sand or ground rock, thoroughly mixing the sand and solution so that the mass is sensibly moist. I then charge the moist mass into a retort or roasting furnace and gradually raise its temperature to about 900° F. or over and I have found that 900° F. from two to three hours furnace treatment is sufficient for my purposes.

After the above described treatment, sands and ground ores containing colloidal gold, which, in their natural state show no signs of the presence of gold, even under a most powerful microscope, will show numerous globules or grains of free gold under a glass or even to the unaided eye, the colloidal gold being thus reduced to a crystalline form as free gold, and the treated sands can then be retreated by amalgamation or any other gold recovery process to secure their gold content, which is readily recoverable.

Where I use mercury with the alkali I first moisten the sand and then mix with it from one half pound to a pound of the mercury to a ton of ore, and I heat the mixture in a retort and direct the vapors given off into water to condense and collect the mercury and such other metals as pass off with it.

The sands and ores which I have treated contain in addition to the gold, considerable quantities of the platinum metals, in the form of a "gel" in a colloidal or prenatal state, which platinum metals, as described in my Patent No. 1,273,202, granted July 23, 1918, are volatilized from the sand or ground rock ores with the vapors of water and of an alkali, and with some ores the addition of mercury and are recovered from the water in which the vapors are condensed.

Having now described my invention, what I claim as new and desire to secure by Letters Patent, is:

1. The method of treating colloidal gold bearing sands or ground rock ores containing colloidal gold to bring their gold contents to readily recoverable condition, which consists in mixing the sands with an alkali and roasting the mixture.

2. The method of treating colloidal gold bearing sands or ground rock ores containing colloidal gold to bring their gold contents to readily recoverable condition, which consists in mixing the sands with water and an alkali and subjecting the mixture to the action of heat.

RUSSELL THAYER.